United States Patent
Aho et al.

[11] Patent Number: 5,941,395
[45] Date of Patent: Aug. 24, 1999

[54] METHOD AND APPARATUS FOR CONVEYING SINGLE USE CAMERA BODIES WHILE SEPARATING LOOSE PARTS THEREFROM

[75] Inventors: Jon Juhani Aho, Henrietta; Alan Victor VanDeMoere, Rochester, both of N.Y.

[73] Assignee: Eastman Kodak Company, Rochester, N.Y.

[21] Appl. No.: 08/633,593

[22] Filed: Apr. 17, 1996

[51] Int. Cl.⁶ ........................................... B07B 1/28
[52] U.S. Cl. ........................ 209/314; 209/396; 209/674
[58] Field of Search ........................... 209/309, 311, 209/314, 393, 396, 592, 659, 660, 674

[56] References Cited

U.S. PATENT DOCUMENTS

| | | | |
|---|---|---|---|
| 3,799,336 | 3/1974 | Holman | 209/674 X |
| 4,143,769 | 3/1979 | Ripple | 209/544 |
| 4,413,739 | 11/1983 | Kohashi | 209/592 X |
| 5,116,486 | 5/1992 | Pederson | 209/12 |
| 5,263,591 | 11/1993 | Taormina et al. | 209/63 |
| 5,427,224 | 6/1995 | Suehara et al. | 198/396 |

FOREIGN PATENT DOCUMENTS

| | | | |
|---|---|---|---|
| 1641468 | 4/1991 | U.S.S.R. | 209/393 |
| 470578 | 8/1937 | United Kingdom | 209/396 |

*Primary Examiner*—Tuan N. Nguyen
*Attorney, Agent, or Firm*—Charles E. Snee, III; Frank Pincelli

[57] ABSTRACT

Used single use camera bodies (10) and miscellaneous loose parts (130, 132, 134) are dumped into a receiver conveyor (72) from which they move to a metering conveyor (88) which delivers them to a series of vibratory grid separators (106, 108, 110) having grid bars (124) separated by slots (126) configured such that each camera body can be positioned with at least one lengthwise corner (148–154) located in the slot and the center of gravity (156) of the camera body positioned above the slot. Camera bodies are thus conveyed lengthwise along the vibratory grid separators to enable loose parts to fall more readily through the slots. Camera bodies are then separated by types at a plurality of sorting stations (186).

21 Claims, 4 Drawing Sheets

METHOD AND APPARATUS FOR CONVEYING SINGLE USE CAMERA BODIES WHILE SEPARATING LOOSE PARTS THEREFROM

TECHNICAL FIELD

The invention concerns methods and apparatus for conveying objects to be recycled and separating from the objects various unwanted parts. More particularly, the invention is related to recycling of single use camera bodies and to methods and apparatus for conveying such camera bodies while separating loose parts received with the camera bodies.

BACKGROUND OF THE INVENTION

In recent years, single use photographic cameras have become popular which are sold to a customer already loaded with unexposed film. Cameras are available with or without flash, for panoramic pictures, with telephoto lens, with water-tight cases, with special graphics and with other distinguishing features. As the customer uses the camera, exposed frames are wound into a light-tight cartridge within the camera. When all frames have been exposed, the customer brings the entire camera to a photofinisher, who removes the cartridge containing the exposed film, processes the film and returns photographic prints to the customer. The photofinisher also may remove the battery from cameras with flash. The remainder of the camera, typically comprising an essentially parallelepipedic camera body enclosing a camera frame, is then returned to the original manufacturer where various parts of the camera are recovered for recycling.

FIG. 1 illustrates schematically a typical single use camera of a type for use with 35 mm film. The features of such cameras are generally well-known and cameras differing in various ways from that illustrated also may be conveyed and recycled in accordance with the method and apparatus of the present invention. As illustrated, a single use camera 10 comprises a light-tight plastic inner camera body 12 which houses: a known fixed-focus taking lens 14; a known film metering mechanism, not shown; a known shutter mechanism, not shown; a known frame counter 16 for visibly indicating the number of exposures remaining; and an electronic flash unit 18, all packaged in a cardboard outer cover or casing 20. Cover 20 is provided with: a front opening 22 for the taking lens; a top opening 24 for a manual shutter release button 26; a rear opening for a manual film advance thumbwheel, not shown; a front opening 28 for a front viewfinder window 30 of a direct see-through viewfinder 32; and a rear opening, not shown, for a rear viewfinder window 34. The cover also includes: a top opening 36 for the frame counter; a front opening 38 for a flash emission window 40; a top opening 42 for a flash-ready light emitting diode 44; and a front opening 46 for a manual push element 48 which is pushed to ready the flash unit. As shown, camera 10 is essentially parallelepipedic in shape with a length L, a width W and a thickness T less than the length or the width.

Since sales of single use cameras run into the millions of units each year, the stream of used cameras being returned presents a significant material handling, conveying and sorting problem. The used cameras typically are returned in large palletized containers about four feet (1.3 m) on a side, containing a random mix of used cameras. Most such cameras currently are wrapped, in various degrees, in a heavy paper carton bearing a considerable variety of graphical information. Although most photofinishers strive to exclude extraneous material from the palletized containers, a variety of loose parts usually is included with the used camera bodies, such as loose batteries, film spools, film canisters, canister tops, and loose camera parts. Such loose parts need to be removed from the incoming stream of recyclables before the various camera bodies are separated, usually manually, by camera type and manufacturer. If the camera bodies and loose parts are simply dumped onto a conveyor for delivery to operators who will sort the various camera types, the flow of cameras on the conveyor tends to jam rather easily as the cameras pile up and become snagged on each other, the loose parts and portions of the conventional conveyor systems. This, of course, slows greatly the necessary sorting of the different camera types and removal of loose parts.

Various systems are known for separating objects to be recycled. For example, U.S. Pat. No. 4,143,769 discloses an apparatus for separating rail road track components in which an oscillating conveyor causes smaller parts to drop through a grid while larger parts are conveyed to a downstream conveyor for further sorting. U.S. Pat. No. 5,116,486 discloses an apparatus for separating recyclable waste comprising a magnetic separator, a vibrating shaker screen and an air sorter for removing various types of material from a waste stream. U.S. Pat. No. 5,263,591 discloses a refuse recycling system in which a stream of refuse is conveyed past operators who remove recyclable materials and deposit them in collection chutes. Finally, U.S. Pat. No. 5,427,224 discloses an apparatus for conveying and aligning used single use camera bodies, in which a rotating cylindrical tube receives the camera bodies and orients them longitudinally for subsequent sorting.

While such known sorting apparatus and methods have achieved some measure of success, a need has continued to exist for a method and apparatus which can receive used single use camera bodies in bulk and efficiently separate the camera bodies from loose parts before the camera bodies are sorted by type and manufacturer.

SUMMARY OF THE INVENTION

An objective of the invention is to provide a method and apparatus for separating from used single use camera bodies various loose parts smaller than a camera body and then conveying the loose parts to stations for sorting.

A further objective of the invention is provide such a method and apparatus in which used single use camera bodies tend to align longitudinally during conveying, to facilitate removal of the loose parts.

Yet another objective of the invention is to provide a method and apparatus in which camera bodies sorted by type are placed in containers and weighed to determine the number of camera bodies of each type.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

The method of the invention is particularly useful for conveying and sorting used single use camera bodies and loose parts, each camera body having a center of gravity and being essentially parallelepipedic in shape with a length, a width and a thickness less than the length or the width. In one embodiment, the method comprises steps of metering a quantity of used camera bodies and loose parts onto a grid comprising a plurality of essentially parallel, elongated bars, adjacent bars being separated by slots, each slot having a minimum transverse width less than the thickness of a camera body but large enough to pass at least a portion of the loose parts, the slots being configured such that each camera body can be positioned with (i) at least one lengthwise corner of the camera body located in a slot and (ii) the center of gravity of the camera body positioned above the slot locating the lengthwise corner; vibrating the grid essentially parallel to a long axis of the elongated bars to cause each camera body to preferentially align with its length extended along the bars and at least one lengthwise corner located in a slot, whereby the camera bodies move lengthwise along the bars and the loose parts fall between the bars; conveying the camera bodies from the grid to a plurality of sorting stations; and sorting different types of camera bodies for recycling.

Preferably, the camera bodies essentially maintain alignment during the conveying step. Usually, only one lengthwise corner of each camera body is located in a slot, whereby each camera body moves lengthwise in a stable, tilted position between a pair of elongated bars. The grid may comprise a plurality of grids, with the slots having a minimum transverse width at an entrance to the first grid and the slots having a maximum transverse width at an exit from the last grid. The method may further comprise steps of placing different types of camera bodies in separate containers; and weighing the containers to determine an approximate number of camera bodies of each type.

The apparatus of the invention is similarly useful and may comprise a grid comprising a plurality of essentially parallel, elongated bars, adjacent bars being separated by slots, each slot having a minimum transverse width less than the thickness of a camera body but large enough to pass at least a portion of the loose parts, the slots being configured such that each camera body can be positioned with (i) at least one lengthwise corner of the camera body located in a slot and (ii) the center of gravity of the camera body positioned above the slot locating the lengthwise corner; means for metering a quantity of used camera bodies and loose parts onto the grid; means for vibrating the grid essentially parallel to a long axis of the elongated bars to cause each camera body to preferentially align with the length extended along the bars and the at least one lengthwise corner located in a slot, whereby the camera bodies move lengthwise along the bars and the loose parts fall between the bars; and means for conveying the camera bodies from the grid to a plurality of sorting stations where different camera types may be sorted for recycling. Preferably, only one lengthwise corner of each camera body is located in a slot, whereby each camera body moves lengthwise in a stable, tilted position between a pair of elongated bars. The grid may comprise a plurality of grids, the first grid having a minimum transverse slot width at an entrance to the grid and the last gird having a maximum transverse width at an exit from the grid. In a preferred embodiment, each elongated bar comprises a pair of flat sides extending downward from a vertex to the minimum transverse width. The vertex may define a right angle between the flat sides. Alternatively, each elongated bar may comprise a rounded cylindrical surface extending between the maximum and minimum transverse widths. In another embodiment, each slot may have a uniform width equal to the minimum transverse width.

The means for metering may include a containment hopper; a first conveyor located at a bottom of the containment hopper; a metering hopper for receiving camera bodies from the first conveyor; a second conveyor located at a bottom of the metering hopper for delivering camera bodies to the grid; first means for sensing depth of camera bodies on the second conveyor; second means for sensing depth of camera bodies on the grid; and means for controlling speed of movement of the first and second conveyors in response to respective outputs from the first and second means for sensing depth. The apparatus also may include means for dumping a bulk container of camera bodies and loose parts into the containment hopper; third means for sensing depth of camera bodies on the first conveyor; and means for controlling a rate of dumping of the means for dumping in response to an output from the third means for sensing depth. The apparatus may further comprise means for conveying containers of different camera types from the sorting stations; and means for weighing the containers to determine an approximate number of camera bodies of each type.

The method and apparatus of the invention provide various advantages. Large quantities of used single use camera bodies and miscellaneous loose parts can be separated quickly and efficiently, without requiring intervention by an operator. Camera bodies are preferentially aligned longitudinally as they move through the grid separators of the apparatus, which facilitates movement of loose parts into the slots between grid bars. After removal of much of the loose parts, the camera bodies are presented to downstream sorting stations in an essentially continuous stream with a depth of only one camera body, which facilitates sorting by operators at the sorting stations

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
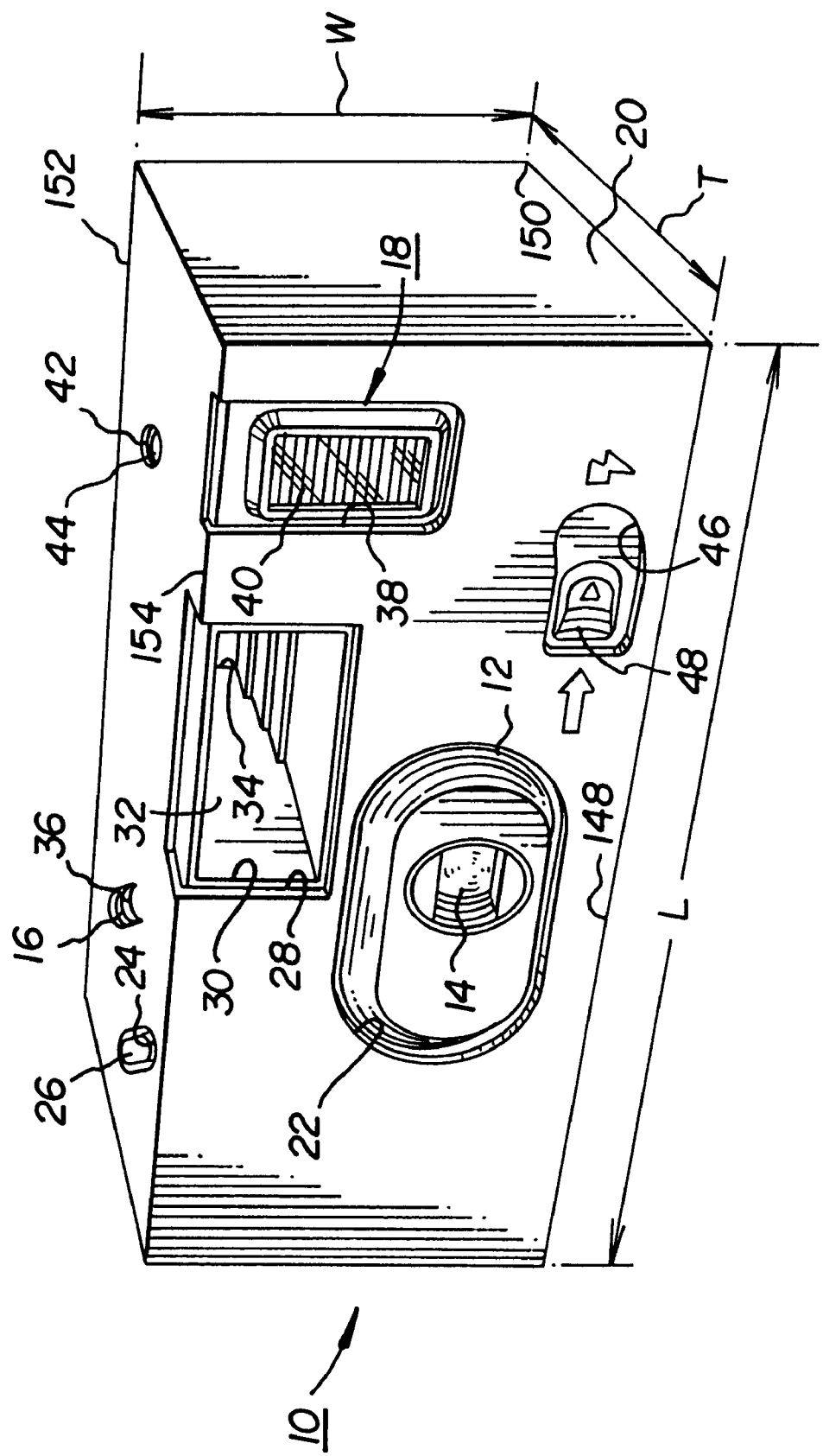
FIG. 1 shows a perspective view of a prior art single use camera of a general type which can be processed in accordance with the invention.

The following is a detailed description of the preferred embodiments of the invention, reference being made to the drawings in which the same reference numerals identify the same elements of structure in each of the several Figures.

Figure 2:
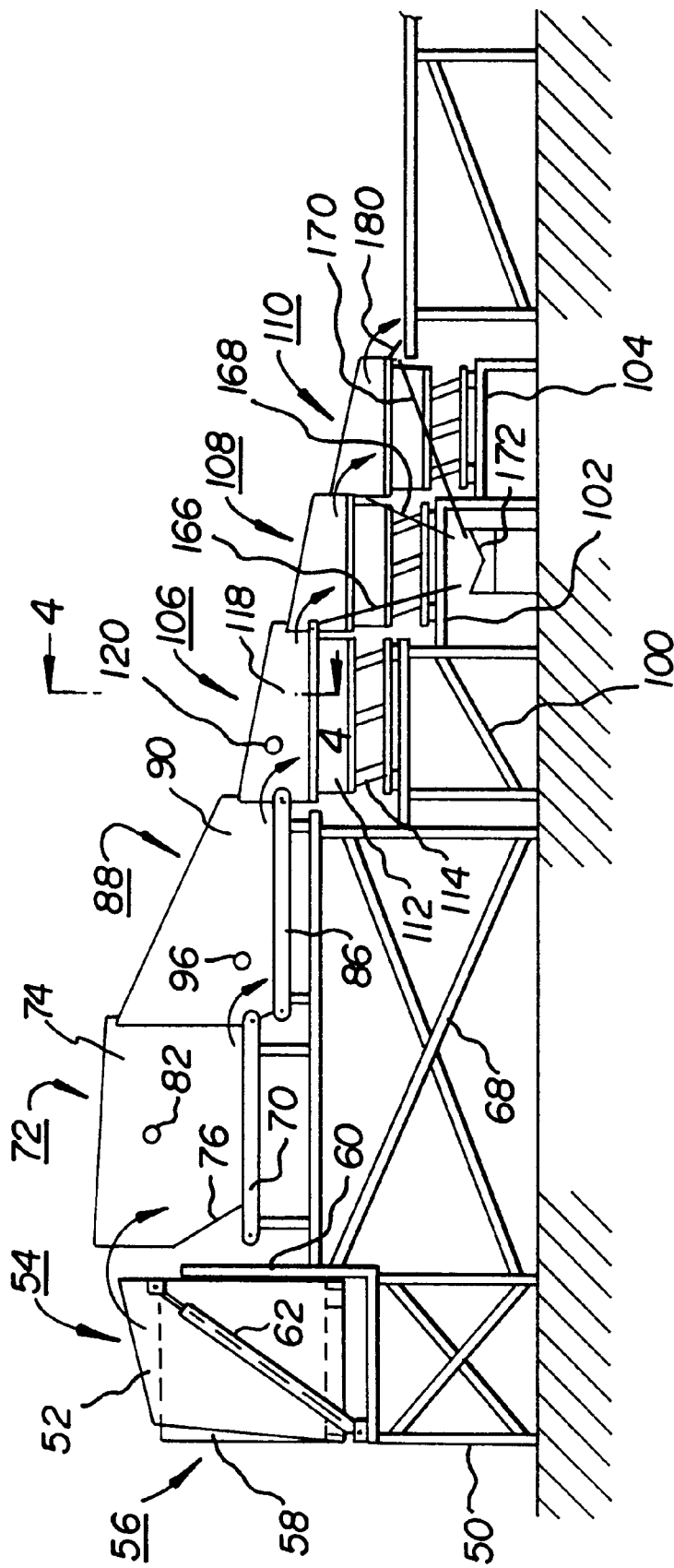
FIG. 2 shows a schematic elevation view of conveying and separating sections of the apparatus of the invention.
Figure 3:
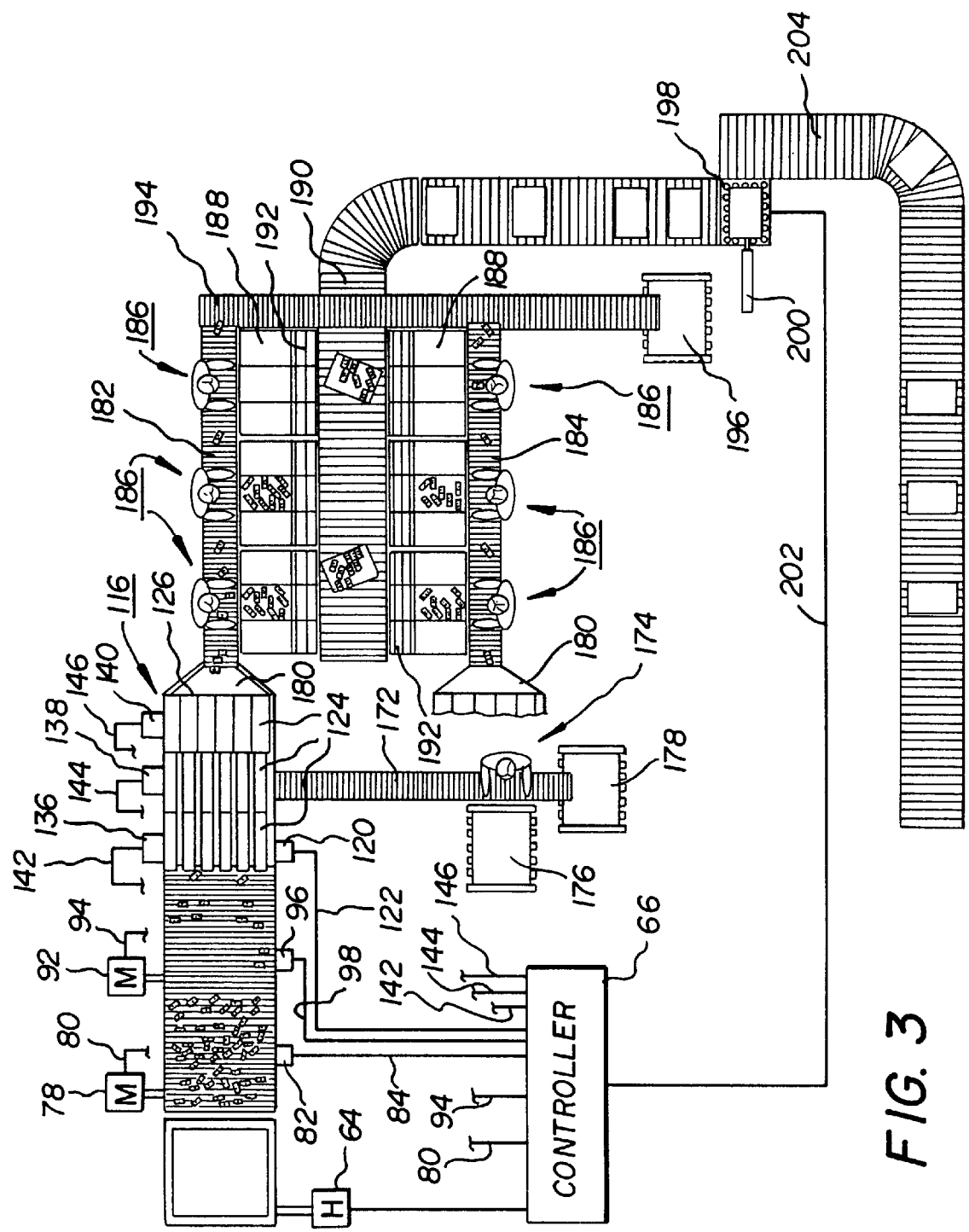
FIG. 3, shows a schematic plan view of the overall apparatus of the invention.
Figure 4:
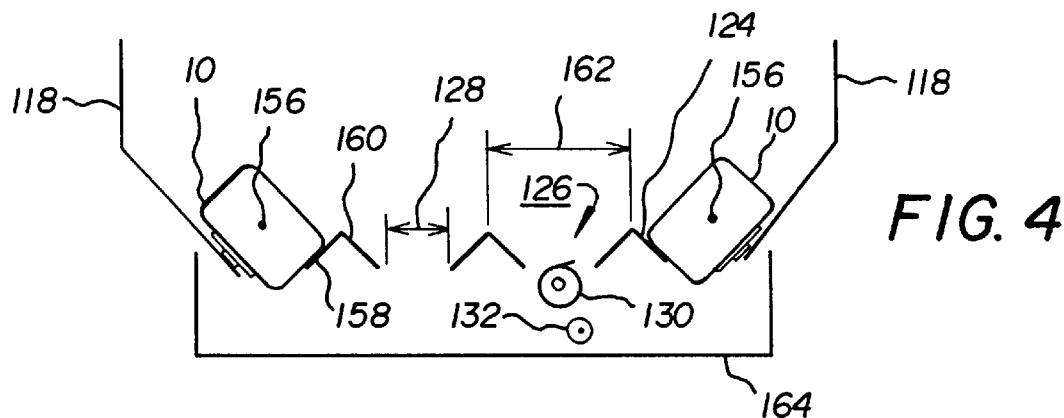
FIG. 4 shows a schematic sectional view of one version of a separator grid according to the invention, taken along line 4—4 of FIG. 2.

Referring simultaneously to FIGS. 2 to 4, those skilled in the art will understand the salient details of the apparatus of the invention. A fabricated unloader support stand 50 pivotably supports a receiver bin 52 having an open top 54 and an open back 56. An open-topped palletized container 58 of used camera bodies and loose parts is placed in bin 52 by any convenient means, such as a fork lift truck. A rigid wall 60 extends upwardly from stand 50 and bin 52 is suitably pivoted or hinged at the upper end of wall 60. A pair of hydraulic cylinders 62, only one being visible in FIG. 2, are located one on each side of bin 52, the lower end of each cylinder being pivoted to stand 50 and the upper end, to bin 52. A conventional hydraulic power supply 64 is connected to cylinders 62 and is operated under the direction of a conventional programmable controller 66. Thus, when cylinders 64 are extended, bin 52 will pivot clockwise as seen in FIG. 2 to dump its contents to an adjacent conveyor. To prevent container 58 from sliding out through open top 54, suitable cross members, not shown, may be provided across the top of bin 52.

Closely adjacent stand 50 and bin 52 is a fabricated conveyor support stand 68 on which are mounted a receiver conveyor 70 and a receiver hopper 72 having side walls 74 on opposite sides of conveyor 70 and a sloped back wall 76. Conveyor 70 is driven by a variable speed motor 78 whose control cable 80 extends from the motor to controller 66. A conventional reflective optical depth sensor 82, or other suitable sensor, is mounted to project a sensor beam between walls 74 at a position corresponding to a depth of used camera bodies considered suitable for flow along the receiver conveyor. When the sensor beam is broken by the flow, a signal is sent over a cable 84 to controller 66, which then adjusts the rate of extension of cylinders 62 as necessary to maintain the suitable depth. Those skilled in the art will appreciate that the suitable depth may be determined empirically, so that the flow of camera bodies will not overwhelm an adjacent metering conveyor.

Also mounted on support stand 68 is a metering conveyor 86, whose inlet end is positioned to accept camera bodies from receiver conveyor 70, and a metering hopper 88 having side walls 90 on opposite sides of conveyor 86. Conveyor 86 is driven by a variable speed motor 92 whose control cable 94 extends from the motor to controller 66. A conventional reflective optical depth sensor 96, or other suitable sensor, is mounted to project a sensor beam between walls 90 at a position corresponding to a depth of used camera bodies considered suitable for flow along the metering conveyor. When the sensor beam is broken by the flow, a signal is sent over a cable 98 to controller 66, which then adjusts the speed of motor 78 as necessary to maintain the suitable depth. The suitable depth is selected so that the flow of camera bodies will not overwhelm an adjacent vibratory grid separator. To minimize the overall height of the apparatus, conveyors 70, 86 may slope slightly uphill from inlet to outlet, not illustrated.

Closely adjacent support stand 68 and metering conveyor 86 is a separator support stand 100, followed by increasingly shorter support stands 102, 104. A trio of vibratory grid separators 106, 108, 110 are supported on stands 100, 102, 104. Except as noted in the following description, the grid separators are essentially identical; so, only separator 106 will be described in detail. A rigid rectangular frame 112 is supported above stand 100 on a plurality of backwardly angled leaf spring assemblies 114, which permit the frame to move forward and backward but essentially prevent lateral movement. Fixedly mounted to frame 112 is a separator grid 116 flanked by a pair of side walls 118. A conventional reflective optical depth sensor 120, or other suitable sensor, is mounted to project a sensor beam between walls 118 at a position corresponding to a depth of used camera bodies considered suitable for flow along the vibratory grid separator. Sensor 120 is provided only on separator 106. When the sensor beam is broken by the flow, a signal is sent over a cable 122 to controller 66, which then adjusts the speed of motor 92 as necessary to maintain the suitable depth. The suitable depth is selected so that the flow of camera bodies will not overwhelm adjacent vibratory grid separators 108, 110.

Separator grid 116 comprises a plurality of essentially parallel, elongated bars 124 separated by elongated slots 126. As shown schematically in FIGS. 4 to 6, regardless of their cross sectional shapes, bars 124 are separated by a minimum transverse slot width 128 which is less than thickness T of a typical camera body as shown in FIG. 1. However, slot width 128 is also large enough to pass at least a portion of any loose parts mixed with the camera bodies, such as film cartridges 130, film spools 132, broken film access doors 134, and the like. Slot width 128 may increase somewhat from a minimum at separator 106 to a larger width at separator 108 and from separator 108 to a maximum width at separator 110, but will always be less than thickness T. Means, not illustrated, may be provided for adjusting the slot width in each separator, to accommodate changes in size of camera bodies. Means 136, 138, 140 are provided to vibrate respective ones of the separators essentially parallel to the long axes of bars 124. Those skilled in the art will appreciate that these means may be conventional electromagnetic or rotary-eccentric vibrators. Cables 142, 144, 146 extend from means 136, 138, 140 to controller 66 to facilitate adjustment of the frequency and period of vibration of the separators. Satisfactory performance has been achieved at about 60 cycles per second with a longitudinal amplitude of about 0.010 inch (0.254 mm). At 60 cycles per second, good performance has been achieved at velocities of the camera bodies along the separator grids in a range of 0.2 to 2.5 inches per second (5.08 to 63.5 mm per second).

As shown in FIG. 1, a typical single use camera 10 will include lengthwise corners 148, 150, 152, 154. Camera bodies with such an essentially parallelepipedic geometry will tend to orient themselves with their long dimensions more or less parallel with grid bars 124. In accordance with the present invention, slots 126 are configured to ensure that at least one of the lengthwise corners of a camera body will tend to be moved into and remain within the slot, as indicated schematically in FIGS. 4 to 6. This will happen in accordance with the invention, provided the center of gravity 156 of the camera body is positioned above the slot which a lengthwise corner of the camera body is located. With the center of gravity so positioned, the camera body will tend to assume a stable position between two adjacent grid bars, which has been observed to facilitate movement of loose parts through the slots since the camera bodies tend not to bridge the slots and jam together on top of the grid. As shown in FIG. 4, the grid bars advantageously may be formed by elongated angle irons 158 having flat upwardly facing sides extending from a vertex 160 with an included angle of about 90 degrees. Grid bars shaped in this manner cause the camera bodies to assume a stable, tilted position with adjacent sides of the camera bodies rather closely engaging flat sides of adjacent angle irons. A maximum transverse width 162 of each slot 126 is selected to ensure that center of gravity 156 will remain above the slot for each camera type to be processed.

Figure 5:
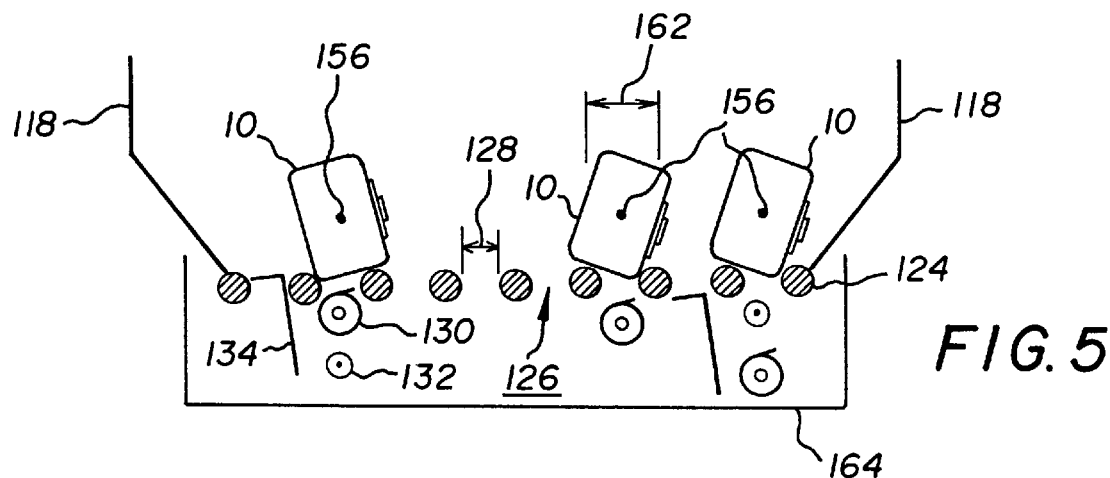
FIG. 5 shows a schematic sectional view of another version of a separator grid according to the invention, taken along line 4—4 of FIG. 2.
Figure 6:
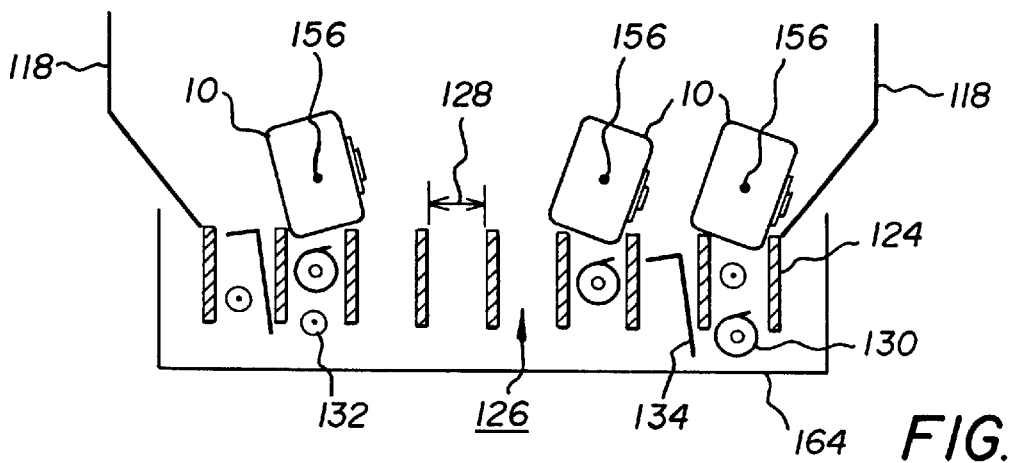
FIG. 6 shows a schematic sectional view of still another version of a separator grid according to the invention, taken along line 4—4 of FIG. 2.

Positioned beneath and extended along each separator grid is a tray 164 for catching loose parts which fall through slots 126. Each tray 164 vibrates with its associated separator grid, thus causing the loose parts to move along beneath the grid toward the discharge end of the separator. As shown in FIG. 5, grid bars 124 may have a rounded cylindrical surface extending between the maximum and minimum transverse widths. And, as shown in FIG. 6, each separator grid 116 may be formed of relatively thin, parallel bars 124; so that, slots 126 have an essentially uniform width which is less than thickness T.

In operation of the apparatus thus far described, palletized container 58 is placed in receiver bin 52. Motors 78, 92 and vibrating means 136, 138, 140 are started by controller 66. Cylinders 62 are extended to pivot bin 52 upward and begin to dump camera bodies and loose parts onto receiver conveyor 70. If the depth of accumulated camera bodies breaks the beam of sensor 82, controller 66 will stop cylinders 62 until the depth drops sufficiently. Camera bodies and loose parts move from receiver conveyor 70 onto metering conveyor 86. If the depth of accumulated camera bodies breaks the beam of sensor 96, controller 66 will adjust the speed of motor 78 until the depth drops sufficiently.

Camera bodies and loose parts move from metering conveyor 86 onto vibratory grid separator 106, where some loose parts fall through slots 126 and the camera bodies begin to align with the slots in the manner previously described. The loose parts fall into tray 164 of separator 106 and leave the separator via a chute 166 shown schematically in FIG. 2. If the depth of accumulated camera bodies on separator 106 breaks the beam of sensor 120, controller 66 will adjust the speed of motor 92 until the depth drops sufficiently. The camera bodies and remaining loose parts then move from separator 106 onto separator 108, where additional loose parts fall through slots 126 and alignment of the camera bodies continues. The loose parts fall into tray 164 of separator 108 and leave the separator via a chute 168 shown in FIG. 2. Finally, the camera bodies and remaining loose parts move from separator 108 onto separator 1110, where still more loose parts fall through slots 126 and alignment of the camera bodies continues. The loose parts fall into tray 164 of separator 110 and leave the separator via a chute 170 shown in FIG. 2. Chutes 166, 168, 170 feed their loose parts onto a loose parts conveyor 172 which moves the parts past a sorting station 174 where an operator can remove recyclable parts, such as circuit boards or film canisters, which are placed in a container 176. Batteries preferably are removed for further use. Remaining, scrap loose parts fall into a container 178 at the end of conveyor 172.

Camera bodies and any remaining loose parts move from separator 110 down a discharge chute 180 into a camera body conveyor 182. A duplicate conveying and separating apparatus, indicated fragmentarily in FIG. 3, may be provided to feed camera bodies and remaining loose parts to a parallel camera body conveyor 184. Conveyors 182, 184 may be located slightly below the outlet of separator 10, as shown in FIG. 2, or may be located in essentially the same plane as the outlet of separator 110, not shown. Along conveyors 182, 184 are located a plurality of sorting stations 186 at which operators can remove cameras of different types and place them in bar-coded containers 188 positioned on the opposite side of conveyor 182, 184 from each operator. Between conveyors 182, 184, a container conveyor 190 is located to receive containers 188 which are full of cameras of particular types, after the operators push the full containers across rollers 192 onto conveyor 190. At the ends of conveyors 182, 184, a scrap conveyor 194 is located to receive any remaining loose parts and scrap materials, which are dumped into a scrap container 196 at the end of conveyor 194.

Full containers 188 move along conveyor 190 to a weigher 198 where the container is weighed and its bar code is read by a conventional scanner, not shown. A cable 202 extends from weigher 198 and the scanner to controller 66, where the weight of each container can be correlated to an approximate number of cameras of the given type read by the scanner from the container. After each container is weighed, a pusher 200 moves the container onto an outfeed conveyor 204 from which it can be removed for further processing.

| Parts List | |
|---|---|
| 10 | single use camera |
| 12 | inner camera body |
| 14 | taking lens |
| 16 | frame counter |
| 18 | flash unit |
| 20 | cardboard outer cover |
| 22 | front opening for 14 |
| 24 | top opening for 26 |
| 26 | shutter release button |
| 28 | front opening for 30 |
| 30 | front viewfinder window |
| 32 | direct see-through viewfinder |
| 34 | rear viewfinder window |
| 36 | top opening for 16 |
| 38 | front opening for 40 |
| 40 | flash emission window |
| 42 | top opening for 44 |
| 44 | flash-ready light emitting diode |
| 46 | front opening for 48 |
| 48 | manual push element to ready 18 |
| 50 | unloader support stand |
| 52 | pivotable receiver bin |
| 54 | open top of 52 |
| 56 | open bakc of 52 |
| 58 | palletized container of used camera bodies |
| 60 | upwardly extended front wall of 52 |
| 62 | hydraulic cylinder for pivoting 52 |
| 64 | hydraulic power supply |
| 66 | programmable controller |
| 68 | conveyor support stand |
| 70 | receiver conveyor |
| 72 | receiver hopper |
| 74 | side wall of 72 |
| 76 | sloped back wall of 72 |
| 78 | variable speed motor for 70 |
| 80 | control cable from 78 to 66 |
| 82 | reflective optical depth sensor |
| 84 | cable from 82 to 66 |
| 86 | metering conveyor |
| 88 | metering hopper |
| 90 | side wall of 88 |
| 92 | variable speed motor for 86 |
| 94 | cable from 92 to 66 |
| 96 | reflective optical depth sensor |
| 98 | cable from 96 to 66 |
| 100, 102, 104 | support stands |
| 106, 108, 110 | vibratory grid separators |
| 112 | rigid rectangular frame |
| 114 | backward angled leaf springs |
| 116 | separator grid |
| 118 | side wall of 106, 108, 110 |
| 120 | reflective optical depth sensor |
| 122 | cable from 120 to 66 |
| 124 | essentially parallel, elongated bars |
| 126 | slots between 124 |
| 128 | minimum transverse width of 126 |
| 130 | film cartridge |
| 132 | film spool |
| 134 | broken camera film access door |
| 136, 138, 140 | means to vibrate 116 |
| 142, 144, 146 | cable from 136, 138, 140 to 66 |
| 148, 150, 152, 154 | lengthwise corners of 10 |
| 156 | center of gravity of 10 |
| 158 | elongated angle iron |
| 160 | vertex of 158 |
| 162 | maximum transverse width of 126 |
| 164 | tray to catch loose parts |
| 166 | chute for loose parts from 106 |
| 168 | chute for loose parts from 108 |
| 170 | chute for loose parts from 110 |
| 172 | loose parts conveyor |
| 174 | sorting station |
| 176 | container for recyclable loose parts |
| 178 | container for scrap loose parts |
| 180 | discharge chute from 110 |
| 182, 184 | camera body conveyor |
| 186 | sorting station |
| 188 | container for specific type of camera body |

-continued

| Parts List | |
|---|---|
| 190 | conveyor for filled containers of specific type of camera bodies |
| 192 | rollers from 186 to 190 |
| 194 | conveyor for scrap from 182, 184 |
| 196 | container for scrap |
| 198 | weigher |
| 200 | pusher |
| 202 | cable from 198 to 66 |
| 204 | outfeed conveyor |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure letters patent for:

1. A method for conveying and sorting used single use camera bodies and loose parts, each camera body having a center of gravity and being essentially parallelepipedic in shape with a length, a width and a thickness less than the length or the width, comprising steps of:

metering a quantity of used camera bodies and loose parts onto a grid comprising a plurality of essentially parallel, elongated bars, adjacent bars being separated by slots, each slot having a minimum transverse width less than the thickness of a camera body but large enough to pass at least a portion of the loose parts, the slots being configured such that camera bodies are positioned with (i) at least one lengthwise corner of the camera body located in a slot and (ii) the center of gravity of the camera body above the slot locating the lengthwise corner;

vibrating the grid essentially parallel to a longitudinal axis of the elongated bars to cause camera bodies to preferentially align with the length extended along the bars and the at least one lengthwise corner located in a slot, whereby the camera bodies move lengthwise along the bars and the loose parts fall between the bars;

conveying the camera bodies from the grid to a plurality of sorting stations; and sorting different types of camera bodies for recycling.

2. A method according to claim 1, wherein the camera bodies essentially maintain alignment during the conveying step.

3. A method according to claim 1, further comprising steps of:

placing different types of camera bodies in separate containers; and weighing the containers to determine an approximate number of camera bodies of each type.

4. A method according to claim 1, wherein only one lengthwise corner of each camera body is located in a slot, whereby each camera body moves lengthwise in a stable, tilted position between a pair of elongated bars.

5. A method according to claim 1, wherein the grid comprises a plurality of individual grids with the slots of a first grid having a minimum transverse width at an entrance to the first grid and the slots of a last grid having a maximum transverse width at an exit from the last grid.

6. A method according to claim 1, wherein the grid is vibrated at about 60 cycles per second at an amplitude of about 0.010 inch.

7. A method according to claim 1, wherein the grid is vibrated at about 60 cycles per second to produce velocities of the camera bodies along the grid in a range of 0.2 to 2.5 inches per second.

8. Apparatus for conveying and sorting used single use camera bodies and loose parts, each camera body having a center of gravity and being essentially parallelepipedic in shape with a length, a width and a thickness less than the length or the width, the apparatus comprising:

a grid comprising a plurality of essentially parallel, elongated bars, adjacent bars being separated by slots, each slot having a minimum transverse width less than the thickness of a camera body but large enough to pass at least a portion of the loose parts, the slots being configured such that each camera body is positionable with (i) at least one lengthwise corner of the camera body located in a slot and (ii) the center of gravity of the camera body positioned above the slot locating the lengthwise corner;

means for metering a quantity of used camera bodies and loose parts onto the grid;

means for vibrating the grid essentially parallel to a longitudinal axis of the elongated bars to cause camera bodies to preferentially align with the length extended along the bars and the at least one lengthwise corner located in a slot, whereby the camera bodies move lengthwise along the bars and the loose parts fall between the bars; and means for conveying the camera bodies from the grid to a plurality of sorting stations where different camera types are sorted.

9. Apparatus according to claim 8, further comprising:

means for conveying containers of different camera types from the sorting stations; and means for weighing the containers to determine an approximate number of camera bodies of each type.

10. Apparatus according to claim 8, wherein only one lengthwise corner of each camera body is located in a slot, whereby each camera body moves lengthwise in a stable, tilted position between a pair of elongated bars.

11. Apparatus according to claim 8, wherein each slot tapers from a maximum transverse width downward to the minimum transverse width.

12. Apparatus according to claim 1, wherein each elongated bar comprises a pair of flat sides extending downward from a vertex to the minimum transverse width.

13. Apparatus according to claim 12, wherein the vertex defines a right angle between the flat sides.

14. Apparatus according to claim 8, wherein the grid is vibrated at about 60 cycles per second at an amplitude of about 0.010 inch.

15. An apparatus according to claim 8, wherein the grid is vibrated at about 60 cycles per second to produce velocities of the camera bodies along the grid in a range of 0.2 to 2.5 inches per second.

16. Apparatus according to claim 11, wherein each elongated bar comprises a rounded cylindrical surface extending between the maximum and minimum transverse widths.

17. Apparatus according to claim 8, wherein each slot has a uniform width equal to the minimum transverse width.

18. Apparatus according to claim 8, wherein the means for metering comprises:

a containment hopper;

a first conveyor located at a bottom of the containment hopper;

a metering hopper for receiving camera bodies from the first conveyor;

a second conveyor located at a bottom of the metering hopper for delivering camera bodies to the grid;

first means for sensing depth of camera bodies on the second conveyor;

second means for sensing depth of camera bodies on the grid; and means for controlling speed of movement of the first and second conveyors in response to respective outputs from the first and second means for sensing depth.

19. Apparatus according to claim 18, further comprising:

means for dumping a bulk container of camera bodies and loose parts into the containment hopper;

third means for sensing depth of camera bodies on the first conveyor; and means for controlling a rate of dumping of the means for dumping in response to an output from the third means for sensing depth.

20. Apparatus according to claim 8, wherein the grid comprises a plurality of individual grids with the slots of a first grid having a minimum transverse width at an entrance to the first grid and the slots of a last grid having a maximum transverse width at an exit from the last grid.

21. An apparatus according to claim 8 additionally comprising an elongated tray, positioned beneath and spaced apart from, and extending along, the grid.

* * * * *